United States Patent [19]

Johnston et al.

[11] 4,289,470

[45] Sep. 15, 1981

[54] LASAGNA NOODLE RIPPLER

[75] Inventors: Michael L. Johnston, Champlin; Loren J. Gordon, Osseo; Dietrich E. Weinauer, Minnetonka, all of Minn.

[73] Assignee: General Mills, Inc., Minneapolis, Minn.

[21] Appl. No.: 145,275

[22] Filed: Apr. 30, 1980

[51] Int. Cl.³ ............................................. A21C 11/24
[52] U.S. Cl. ............................... 425/336; 425/367; 425/369; 425/403
[58] Field of Search ............... 425/369, 336, 403, 367

[56] References Cited

U.S. PATENT DOCUMENTS 2,539,356  1/1951  Sidebotham .................... 425/369
2,686,720  8/1954  LaRosa ............................. 99/85
3,862,818  1/1975  Atwood ........................... 425/403
4,166,136  8/1979  Stoll ................................. 426/144

*Primary Examiner*—James H. Derrington
*Attorney, Agent, or Firm*—Gene O. Enockson; John A. O'Toole

[57] ABSTRACT

An apparatus for shaping semolina dough ribbons into pasta products useful for lasagna. The apparatus shapes and dough ribbons to give opposite marginal edges which are undulated to provide ruffles. The apparatus comprises a frame supporting a pair of vertically spaced, transverse shafts upon which are mounted matched crimp rolls. Motor and gear means are provided to counter rotate the shafts. The crimp rolls are formed with opposite marginal, fluted edges for shaping the dough.

18 Claims, 8 Drawing Figures

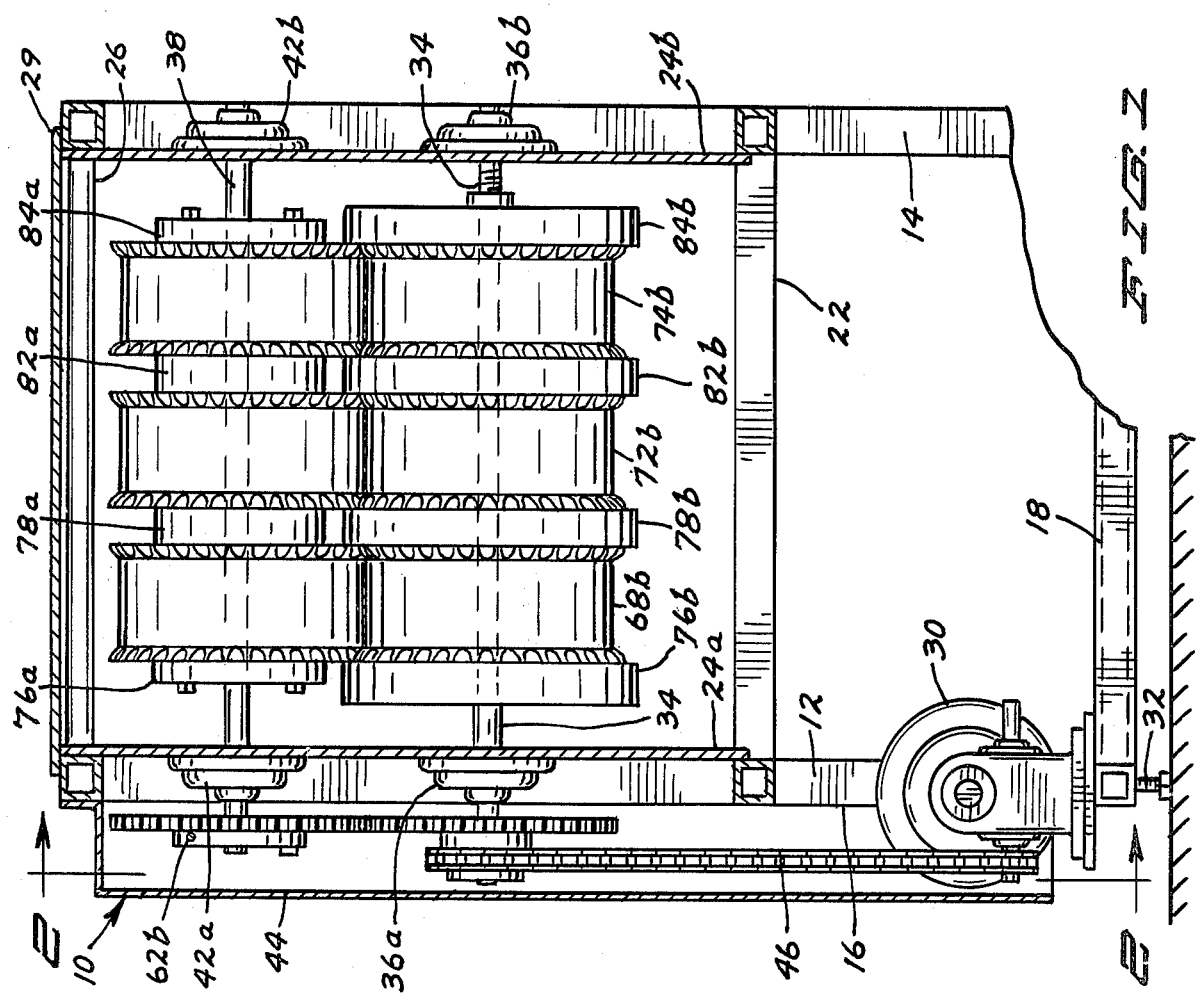
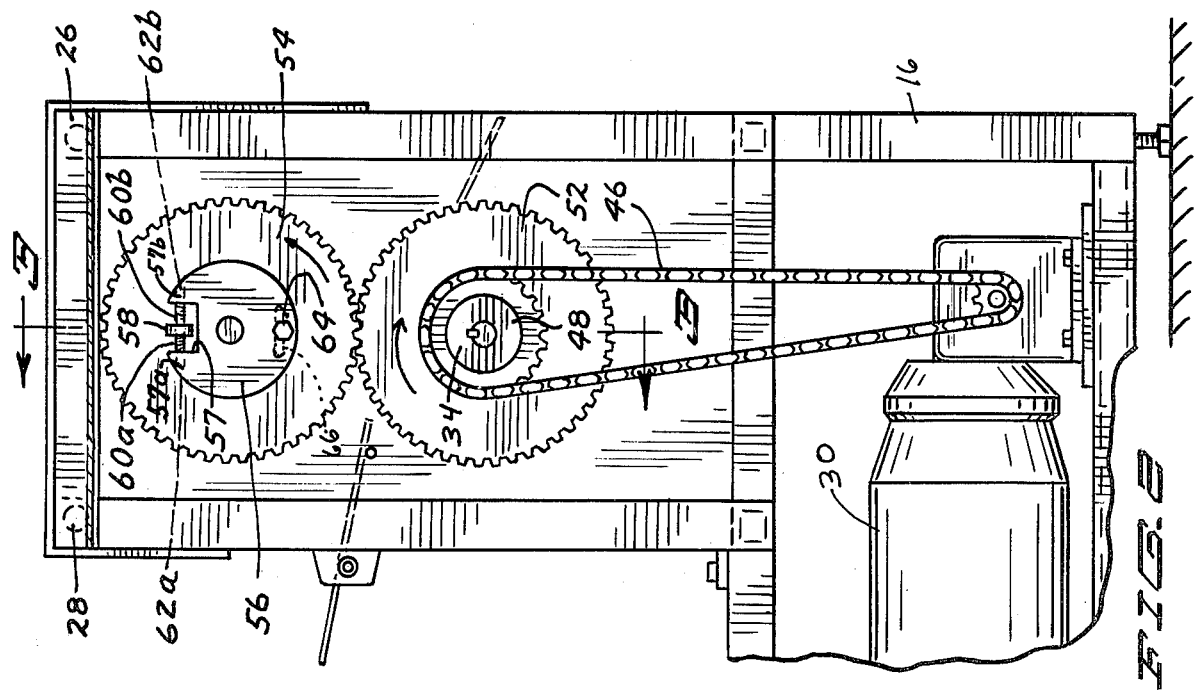

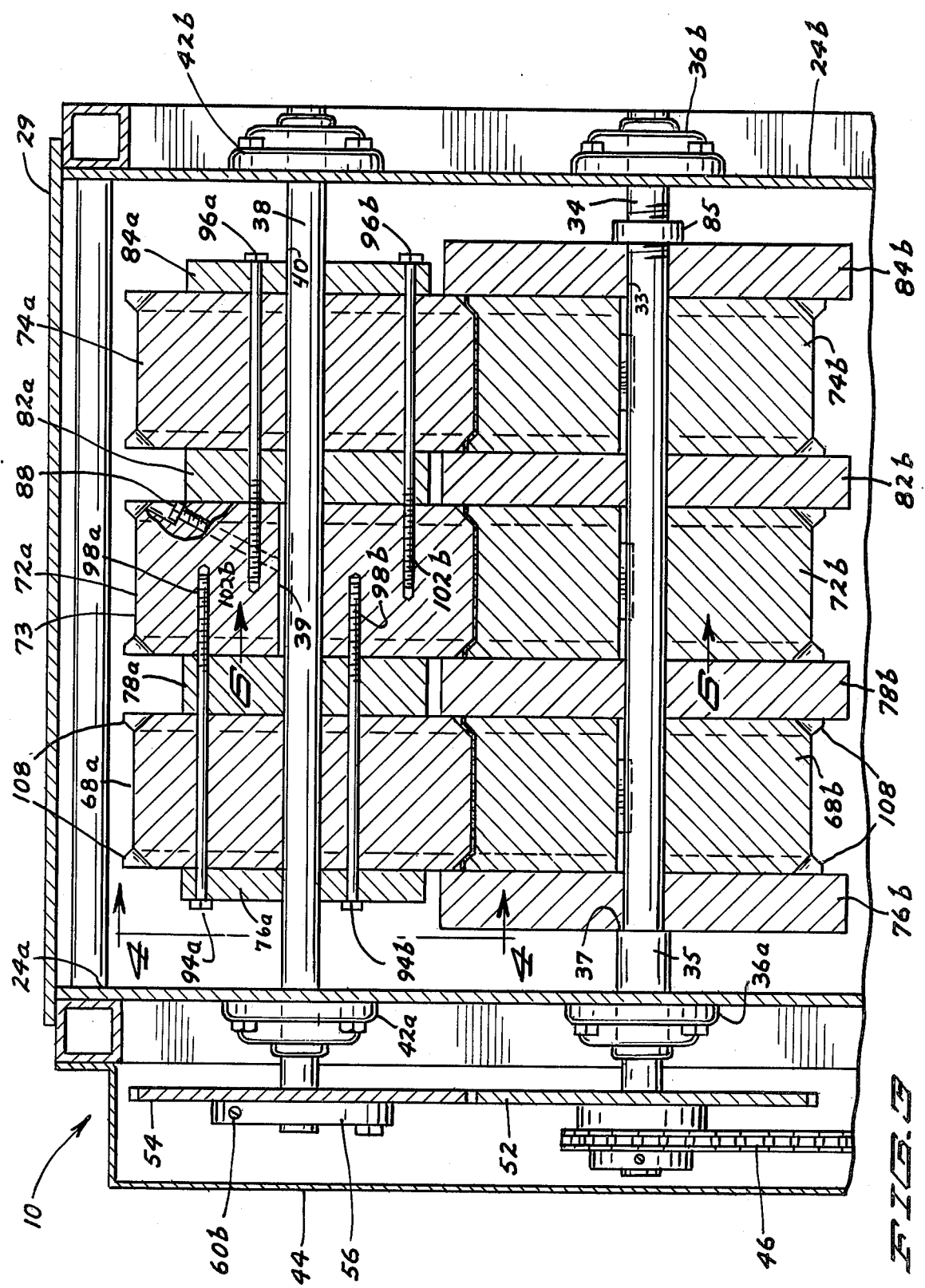

LASAGNA NOODLE RIPPLER

BACKGROUND OF THE INVENTION

1. Field of the Invention

The present invention relates to apparatus for the forming of ripples on the margin of edible dough strips, such dough strips to be used for the production of lasagna noodles.

2. The Prior Art

Pastas (sometimes referred to as alimentary pastes) are staple articles of commerce. Conventionally, pastas are prepared by forming a dough from a mixture of flour and liquid (usually water or milk), sometimes with other added ingredients, extruding the resulting dough under pressure into the desired product shape, and then drying the extruded product under controlled conditions. Pasta products prepared by such extrusion methods include those suitable for use in lasagna. Such products are referred to herein as lasagna strands.

Lasagna pasta was originally made by hand by shaping the margins of noodle strips. Noodles are prepared by a different process than for extruder shaped pastas. Generally, the noodle ingredients are admixed and kneaded to form a dough with a developed gluten structure. Thereafter, the dough is worked into sheets, rolled to desired widths and lengths to form noodle strips.

It would be desirable to be able to shape mechanically the margins of noodle strips to provide rippled lasagna noodles having traditional ripples or fluted edges. The present apparatus can be used to provide lasagna pasta from noodle strips. Such an apparatus, particularly those embodiments comprising multiple crimp roll pairs, enable a more rapid production of shaped lasagna pasta compared to production rates achievable by conventional pasta extrusion apparatus.

SUMMARY OF THE INVENTION

The present invention relates to apparatus which can form lasagna noodle dough strands from noodle dough ribbons. The present apparatus forms fluting in the opposite margins of the noodle dough ribbons characteristic of lasagna pasta.

The apparatus comprises at least one pair of vertically aligned crimp rolls having their opposite marginal pheripheral edges undulated to form fluting comprising alternating teeth and notches. The fluting extends equidistantly within and beyond the roll radius. The rotational alignment of the crimp rolls with respect to each other, is such that the teeth of the upper roll nest in the notches of the lower roll and vice versa.

The crimp rolls are secured to a pair of spaced, vertically aligned shafts which are rotatably mounted on a suitable frame. One shaft is rotated by a combination of a motor, drive chain and sprocket mounted on one shaft. The shafts are counter rotated, and thus the crimp roll pairs, at equal speeds by conventional spur gears mounted on the shafts.

BRIEF DESCRIPTION OF THE DRAWINGS

FIG. 1 is an end view, partially cut away, of one embodiment of the present apparatus;

FIG. 2 is a sectional view, partially cut away, of the apparatus taken along lines 2—2 of FIG. 1;

FIG. 3 is an enlarged, partial, sectional view of the apparatus, taken along lines 3—3 of FIG. 2;

DESCRIPTION OF THE PREFERRED EMBODIMENT

Figure 4:
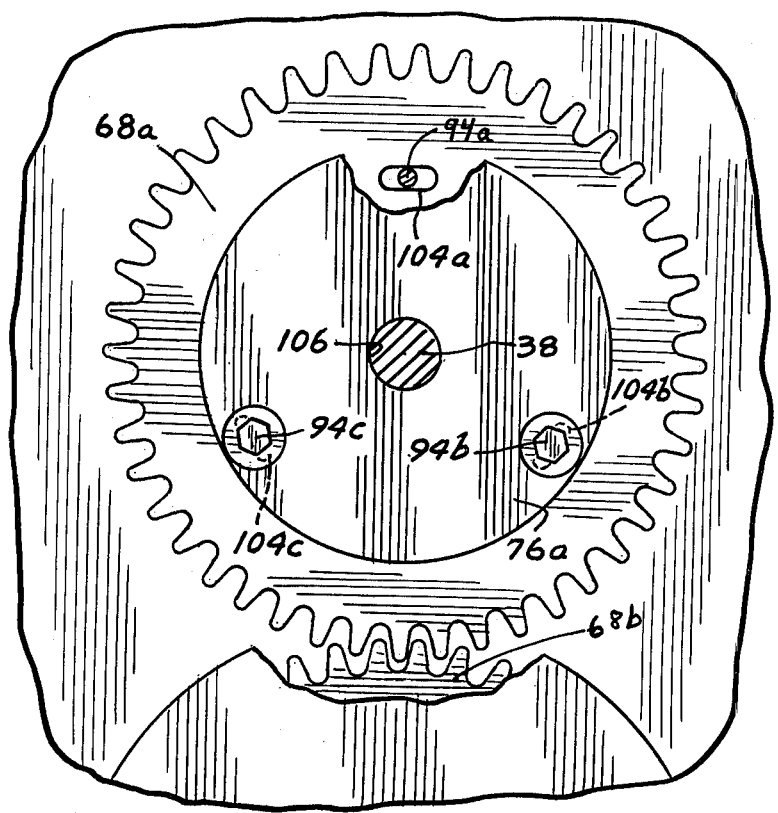
FIG. 4 is an enlarged, partial sectional view of a crimp roll pair taken along lines 4—4 of FIG. 3.

The present invention relates to an apparatus which can form lasagna noodle dough strands from noodle dough ribbons. The present apparatus forms fluting in the opposite margins of the dough ribbons characteristic of lasagna pasta. The apparatus comprises at least one pair of counter rotating crimp rolls having specially shaped fluting about the periphery of the opposite margins of the rolls. As the dough ribbons pass through the nip of the counter rotating crimp rolls, the deformable dough is shaped by the crimp roll fluting.

Referring now to the drawings, and to FIG. 1 in particular, there is shown an embodiment of the present noodle dough rippling apparatus or lasagna noodle rippler which is designated generally by reference numeral 10. The apparatus 10 includes a frame 12 for supporting the crimp rolls. The frame 12 is conventional in design and, generally includes a pair of vertical support members 14 and a pair 16, and horizontal members 18 and 22, as well as an opposed pair of laterally spaced end plates 24a and 24b. Additional lateral support of the end plates 24a and 24b is provided by a pair of space bars 26 and 28. If desired, the frame 12 can also include a removable top guard or cover plate 29. In FIG. 1, the frame 12 is depicted as also supporting a motor or drive means 30, although such motor support by the frame is not critical. Preferably, the frame is equipped with height adjusters such as 32 to level the apparatus. Optionally, the apparatus 10 can be provided with a guard plate 44.

As shown in FIG. 1, the apparatus 10 includes a first or lower drive shaft 34 extending transversely between the end plates 24a and 24b so that it is horizontally oriented. The drive shaft 34 is supported or journaled to the frame 12 at each end by bearing members 36a and 36b which are secured to the frame 12. A second, transversely extending, upper or driven shaft 38 is positioned vertically above the drive shaft 34 so that it is parallel to it, and it is similarly journaled to the frame 12 by a pair of support bearings 42a and 42b. The apparatus 10 further includes one or more pairs of crimp rolls wherein one member of each pair of crimp rolls is secured to the drive shaft 34, such as described infra.

As can be seen more clearly in FIG. 2, the motor 30 is in driving engagement with the drive shaft 34 by means of a drive chain 46 which engages a conventional sprocket 48, such sprocket being keyed to the drive shaft 34, so that the sprocket and shaft rotate together. A first or drive gear 52 is also keyed to the drive shaft 34 and a second or driven gear 54 is connected to the shaft 38 so that they are in engagement with each other. Both gears are conventional spur gears, and they have the same radius, thickness, teeth number, pitch diameter, etc. Thus, once the driven gear 54 is secured to the driven shaft 38, as explained below, the driven shaft 38 is caused to counter rotate relative to the drive gear 34, which rotates in a clockwise direction when viewed as in FIG. 2.

The driven gear 54 is secured to the driven shaft 38 through the agency of an adjustment hub 56, which is fixedly connected to the driven shaft 38 by appropriate means. As shown, the adjustment hub 56 is formed with a rectangular notch 57 thus forming a pair of shoulders 57a and 57b. A pair of set keys 60a and 60b are threadedly mounted in the shoulders 57a and 57b through a set of threaded bores 62a and 62b which run parallel to the plane of the hub 56. A gear tab 58 projects outwardly from the surface of the driven gear 54, into the space between the shoulders 57a and 57b, and more specifically, between the ends of the set screws 60a and 60b. The rotational position of the adjustment hub 56, with respect to the gear 54, and thus the driven shaft 38, is set by the screws 57a and 57b which abut against the opposite sides of the tab 58 through the threaded bores 62a and 62b in the sides of the adjustment hub 56. The adjustment hub is further secured to the driven gear by a tapping screw 64 which threadedly engages a borehole in the driven gear through an arcuate slot 66 (shown in dotted lines) formed in the adjustment hub 56. Such a construction allows the driven shaft 38 to be adjustably rotated slightly relative to the drive shaft 34 to rotationally align properly the fluting of the center, upper crimp roll as explained below.

Reference is now made to FIG. 3, which depicts a preferred embodiment of the present invention. FIG. 3 illustrates three pairs of crimp rolls 68a and 68b, 72a and 72b, and 74a and 74b. The shafts 34 and 38 are provided with axially extending key ways 33 and 40, respectively. Each lower crimp roll is provided with an axial bore, having a groove or key way therein which permits the roll to be keyed to the drive shaft 34. Such a construction, of course, thus causes the lower crimp rolls to rotate with the drive shaft 34. Each roll is formed with a fluted margin at each side surface for forming the fluted margins on dough ribbons to form the lasagna strands. Such a fluted margin or "fluting" as used herein is denoted generally by numeral 108.

The lateral positions of the lower crimp rolls, 68b, 72b, and 74b on the shaft 34, are set by spacer plates or discs 76b, 78b, 82b, and 84b. It is not necessary that the lower spacer plates be keyed to the drive shaft 34.

As can be seen in FIG. 3, a portion 35 of the drive shaft 34 intermediate the bearing 36a and the spacer 76b is relatively larger in diameter than the remainder of the shaft. Such a construction provides a shoulder 37 against which the spacer plate 76b can rest. The lower spacer plates and lower crimp rolls are held snugly together by the nut 85 which tightens onto a threaded portion of the drive shaft 34 proximate the end plate 24b.

In the preferred embodiment, the lower spacer plates 76b, 78b, 82b and 84b are larger in diameter than the lower crimp rolls 68b, 72b and 74b so as to provide a guide for the noodle dough ribbon as it passes between the crimp rolls. It is highly preferred that the diameter of the lower spacer plates should be sufficiently large so that the outer edge of the spacer plates extends above the fluting of the upper matching crimp roll.

Figure 5:
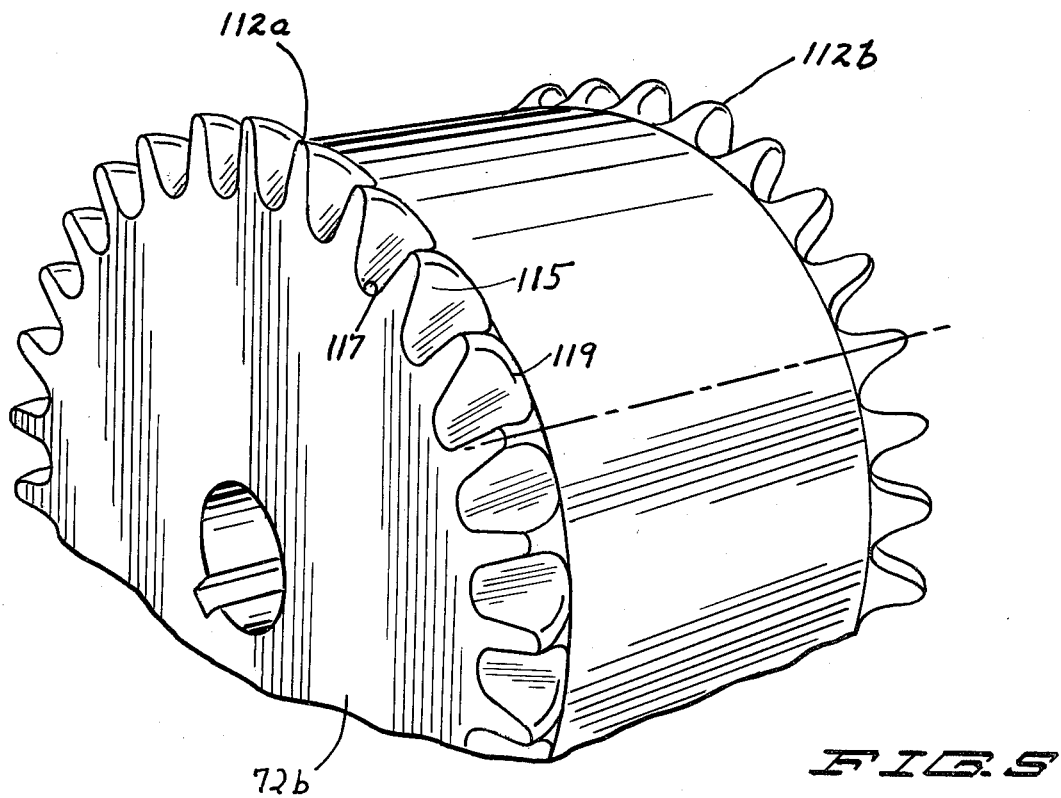
FIG. 5 is an enlarged, partial, perspective view of a crimp roll illustrated in FIGS. 1-4.

At this point it might be appropriate to describe the specific construction of the crimp rolls. In this regard, reference is made to FIG. 5, which is an enlarged, partial perspective view of the crimp roll 72b. It should be borne in mind that all of these crimp rolls have substantially the same configuration. The crimp roll is formed with its opposite marginal edges undulated or fluted as shown, such expression being used herein to refer to alternating notches 117 and teeth 115 as seen in the drawings. The fluting extends approximately equally above and below the crimp rolls circumferential surface. Importantly, the fluting of each margin is as uniform as possible. Moreover, it is important that the peaks of each tooth on one end margin align with the peak of a tooth on the opposed margin. As can be seen in FIG. 5, the peak 112a of a tooth is aligned with the peak 112b of a tooth. Additionally, the teeth are shown as having somewhat rounded edges 119. The rounding includes cutting of the crown of the teeth. Such a construction prevents cutting or scissoring of the pasta dough ribbons while the dough is being shaped by passage between a pair of counter rotatably rolls.

Referring once again to FIG. 3, it is seen that the upper, center crimp roll 72a is keyed to the notched driven shaft 38 by means of a key 39 which engages the key way 40. It is important to laterally align or position the crimp roll 72a so as to be directly above its matching lower crimp roll 72b. Such lateral alignment or spacing of the upper crimp roll 72a relative to the shaft 38 is locked by a set screw 88 which is threadedly mounted in a bore 92. The set screw forces the key 39 against the driven shaft 38 so that the upper crimp roll 72a is secured on the shaft so that it will rotate with the driven shaft 38. In the preferred embodiment depicted in FIG. 3, the bore 92 is angled from the side surface of the crimp roll 72a, as opposed to the roll's peripheral or circumferential surface 73. Such a construction eliminates any recess in the roll circumferential surface which might collect small dough amounts that might lead to unsanitary conditions.

It is further seen in FIG. 3 that the upper, end crimp roll 68a is laterally positioned above crimp roll 68b by means of the spacer plate 78a having a thickness corresponding to that of the spacer plate 78b. Since the upper spacer plates do not serve the same guide function for the lasagna noodle dough as do the lower spacer plates, the upper spacer plates are relatively smaller in diameter than the upper crimp rolls. The crimp roll 68a is operatively connected to the driven shaft 38 by being secured or locked to the crimp roll 72a by means of a plurality of elongated tap screws 94a, 94b, 94c (not shown). The tap screws pass through bores in the end spacer plate 76a, further through slots 104a, 104b, 104c in the crimp roll 68a, and then through bores in the spacer plate 78a. The tap screws threadedly engage threaded bores 98a, 98b, and a third not shown, respectively formed in the center, upper crimp roll 72a.

The upper, end crimp roll 74a is laterally aligned or spaced and operatively connected to the driven shaft 38 in a similar manner as that described for upper crimp roll 68a. Thus, FIG. 3 shows upper spacer plates 82a and 84a each having aligned bores with those bores in upper crimp roll 74a itself. There is further shown tap screws 96a, 96b, extending through the bores. The tap screws then threadedly engage threaded boreholes 102a, 102b, etc. also formed in the center upper crimp roll 72a.

It is also important to rotationally align the fluting of the crimp roll 72a with the fluting of the lower crimp roll 72b so that the fluting rolls are in staggered alignment. A brief reference is now made to FIG. 6 which shows the desired interspacing of the flutings of the crimp roller pairs. Once the upper crimp roll 72a is laterally aligned or spaced and is captured to the driven shaft 38, such fluting rotational alignment is accomplished by the small, rotational adjustments, e.g., 2°, of the driven shaft for which the previously described adjustment hub 56 allows.

It is as equally important to align rotationally the fluting 108 of the upper, end crimp roll 68a with its matched lower crimp roll 68b as it is for crimp rolls 72a and 72b. Similarly, the fluting of the pair of crimp rolls 74a and 74b should be aligned. The structure by which such an alignment for both crimp roll pairs is provided is best seen now in FIG. 6. In FIG. 4, the head of tap screw 94a and a portion of the spacer plate 76a are partially removed to illustrate that the upper crimp roll 68a is provided with a plurality of equally spaced slots 104a, 104b, 104c, etc. Since the upper crimp roll 68a is not keyed to the driven shaft 38, it is free to rotate relative thereto. Such slots thus allow the crimp roll 68a to be rotated or pivoted slightly about the axis of the driven shaft 38 so as to align its fluting 108 relative to its matched lower end crimp roll 68b. Once the fluting 108 of the upper and lower crimp roll has been properly aligned, the tightened tap screws 94a, 94b, 94c, cause the crimp roll 68a to rotate with crimp roll 72a and the crimp roll 68a is thereby operatively connected to the driven shaft 38.

The upper crimp roll 74a is rotationally aligned and operatively connected to the driven shaft 38 in a manner similar to that described above for upper crimp roll 68a. Of course, the skilled artisan will appreciate that apparatus within the scope of the present invention can be provided with any number of pairs of rolls which are so laterally and rotationally aligned and connected to the shafts as described herein.

In one preferred embodiment, the crimp rolls can be readily machined from aluminum blocks. The aluminum crimp rolls are then hard chrome plated, that is, provided with a 0.0005 to 0.0010 in. coating of chrome plate. The chrome plating provides a tough, durable and corrosion resistant surface for the pasta dough ribbons.

Figure 6:
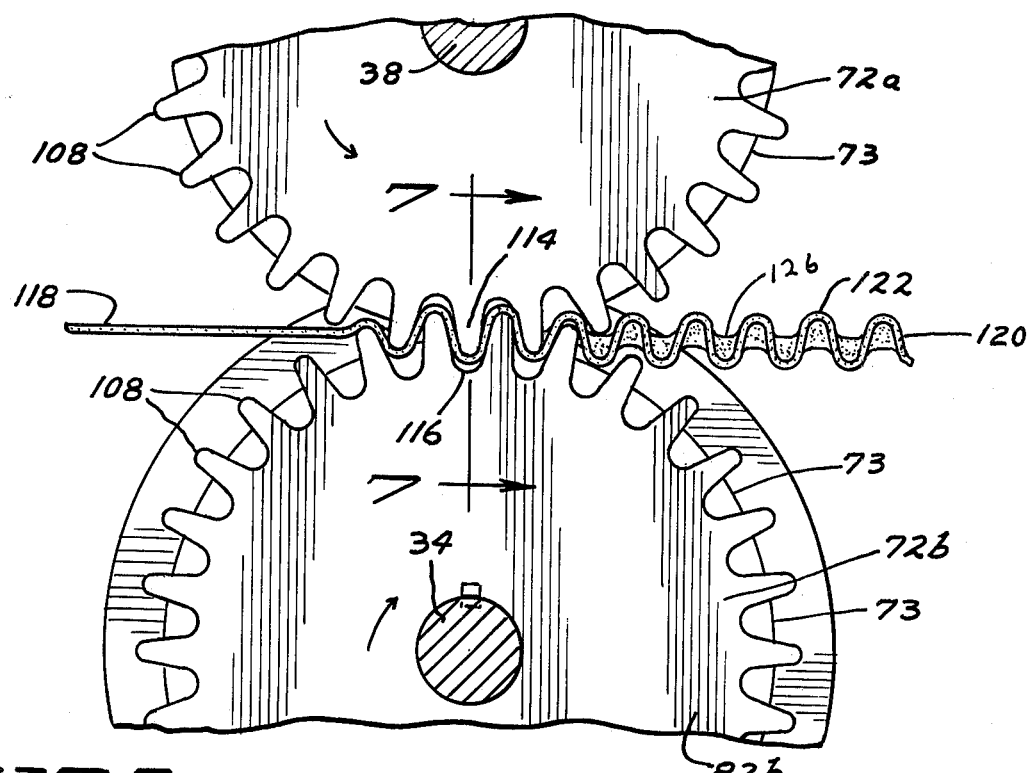
FIG. 6 is an enlarged partial, sectional view which illustrates a pair of crimp rolls engaging a dough ribbon and forming such ribbon into a dough strand, such view taken along lines 6—6 of FIG. 3.
Figure 8:
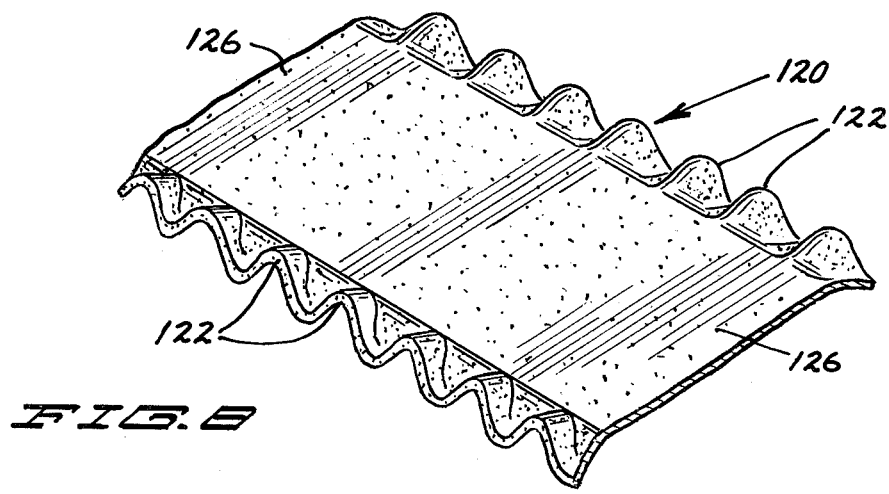
FIG. 8 is a perspective view of the rippled lasagna noodle strand formed by the present apparatus.

Reference is now made to FIG. 6 which is a sectional view taken along lines 6—6 of FIG. 3, i.e., taken between the spacer and the pair of crimp rolls 72a and 72b. This drawing shows the properly aligned fluting of the crimp roll pair engaging a dough ribbon 118. The upper crimp roll 72a is rotationally aligned with respect to the lower crimp roll 72b so that tooth 114 in the upper crimp roll 72a nests in the notch 116 formed in the lower crimp roll 72b. A flat dough ribbon 118 is seen engaged by crimp rolls 72a and 72b. The deformable or plastic dough deforms to fill the interstitial volume between the peaks and notches of the pair of aligned crimp rolls. A rippled lasagna noodle dough ribbon 120 is thus provided having a central plane 126 and a pair of opposite marginal edges which are undulated to provide ruffles 122. As best shown in FIG. 8, the outer edges of the ruffles extend substantially equidistantly above and below the ribbon.

Figure 7:
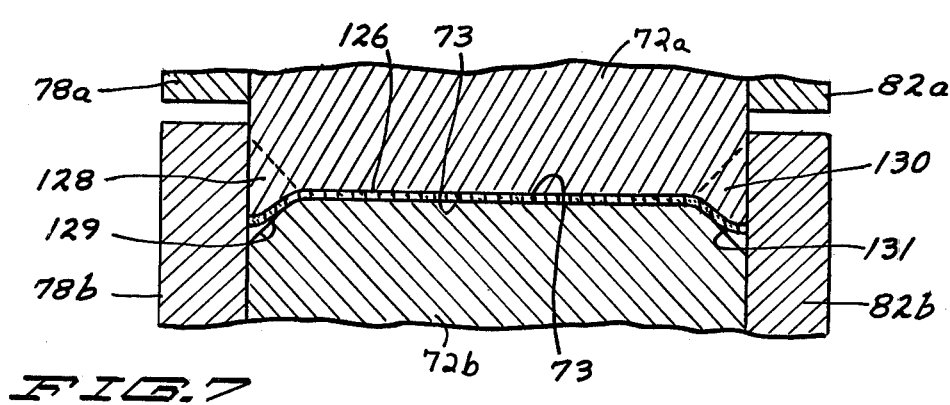
FIG. 7 is an enlarged partial sectional view taken along lines 7—7 of FIG. 6.

Another view of the plastic dough which deforms to fill the interstitial volume between the aligned pair of crimp rolls is shown in FIG. 7. The upper crimp roll 72a is positioned above roll 72b so as to provide a gap through which the dough ribbon's central plane 126 passes. Peak's 128 and 130 are each seen to have crowns 129 and 131, respectively, cut parallel to the axis of the roll or "capped" as used herein so as to avoid scissoring the dough ribbon as noted supra. The lower spacer plates 78b and 82b extend upwardly or radially above the fluting 108 of the upper crimp roll 72a so as to form a guide for the edges of the dough ribbon. This guide feature helps prevent the ribbon from moving laterally, thereby ensuring the forming of a more uniform product.

FIG. 8 is a perspective view of a lasagna strand having opposite fluted margins which have been produced by the present lasagna noodle rippler. As can be seen, the peaks and valleys or troughs of the opposite fluted margins are aligned. Such an alignment, of course, results from the corresponding alignment of the fluting 108.

OPERATION OF THE INVENTION

The motor 30 engages the drive chain 46 which in turn engages the sprocket 48 keyed to the drive shaft 34. Thus, once the motor 30 is energized, the drive shaft 34 is caused to rotate in a clockwise direction when viewed as in FIG. 2. The drive shaft 34 causes the driven shaft 38 to counter rotate by engagement of the drive gear 52 and the driven gear 54. As the shafts counter rotate, the pairs of crimp rolls are also caused to counter rotate.

Noodle dough ribbons are provided comprising, for example, semolina with a moisture content of about 30% by weight and are formed in conventional manner into dough sheets of desired thickness and cut into three continuous ribbons of noodle dough 118.

Three noodle dough ribbons are then fed into the nips of the three pairs of counter rotating crimp rolls. Once fed to the crimp rolls, the present apparatus 10 is self feeding. The ribbons exit the apparatus 10 as a continuous ribbon of shaped lasagna pasta 120. Thereafter, the lasagna pasta ribbon is cut into pieces of desired length. The shaped pasta thus formed, is suitable for use as lasagna noodles. Such lasagna noodles are particularly useful in the provision of pre-cooked, frozen lasagna.

What is claimed is:

1. An apparatus for shaping dough ribbons into lasagna strands having opposite marginal edges undulated to provide ruffles, comprising:

A. a support structure;

B. a first horizontally aligned shaft rotatably mounted on said support structure;

C. a second horizontally aligned shaft vertically oriented relative to said first shaft and parallel thereto, said second shaft rotatably mounted on said support structure;

D. means for rotating said first shaft about its longitudinal axis;

E. means for counter rotating said second shaft about its longitudinal axis in response to rotational movement of said first shaft;

F. a pair of matching crimp rolls, said crimp rolls each having a pair of opposite marginal peripheral edges undulated to form fluting wherein the fluting extends equidistantly within and beyond the roll radius and wherein the crimp rolls are mounted on each shaft such that the fluting of one of the rolls is both in rotational and in lateral alignment with the fluting of the other roll;

G. means for fixedly connecting a first crimp roll to the first shaft so that it is caused to rotate about the shaft axis as the shaft rotates;

H. means for operatively connecting a second crimp roll to the second shaft so that said second crimp roll is caused to rotate about the shaft axis as the shaft rotates.

2. The apparatus of claim 1 wherein the means for rotating said shafts includes: a first gear fixedly connected to the first shaft; and a second gear mounted on said second shaft so that it meshes with said first gear, said second shaft being pivotably adjustable relative to said second gear.

3. The apparatus of claim 2 including a pivotal adjustment means for rotating said second shaft and said second crimp roll relative to said first shaft and said first crimp roll whereby the angular orientation of said second crimp roll can be adjusted relative to said first crimp roll.

4. The apparatus of claim 3 wherein said adjustment means includes a hub, means for fixedly attaching said hub to the second shaft, and means for operatively connecting said hub to the second gear whereby said second shaft is caused to counter rotate relative to said first shaft.

5. The apparatus of claim 4 wherein the means for operatively connecting said hub to the second gear includes a tab projecting perpendicularly to the plane of the second gear and fixedly connected thereto, and wherein the hub is formed with a notch through which the tab projects, said notch forming a pair of shoulders, each shoulder having a threaded, screw-receiving bore running parallel to the plane of the hub; and a pair of screws screwed into said bores until the screw tips tighten to engage the opposite sides of the tab.

6. The apparatus of claim 5 wherein the notch is rectangular.

7. The apparatus of claim 1 wherein the fluting on each crimp roll is formed such that the peaks of each tooth on one end margin align with the peaks of a tooth on the opposed margin.

8. The apparatus of claim 1 additionally comprising:
a second pair of matching crimp rolls comprising a third roll and a fourth roll mounted vertically, one on each shaft; a first means for laterally spacing the second crimp roll pair with respect to the first pair of rolls;
a means for fixedly connecting the third crimp roll to the first shaft so that it is caused to rotate about the first shaft axis as the shaft rotates; and
a means for operatively connecting the fourth crimp roll to the second shaft so that said fourth crimp roll can be rotatably aligned with the third crimp roll.

9. The apparatus of claim 8 wherein the first means for laterally spacing the second crimp roll pair comprises a spacer plate pair, wherein one member of the spacer plate pair is mounted on the first shaft and the second member is mounted vertically above the first member on the second shaft, wherein each member of the spacer plate pair is of equal thickness and wherein the spacer plate members are mounted on the shafts between the crimp rolls.

10. The apparatus of claim 9 wherein the spacer plate pair member mounted on the first shaft has a diameter sufficiently large so as to extend above the fluting of the crimp rolls mounted on the second shaft thereby forming a guide.

11. The apparatus of claim 10 additionally comprising a second spacer plate pair wherein a first one member of the second spacer plate pair is mounted on the first shaft and the second member of the second spacer plate pair is mounted vertically above said first member and wherein each member is mounted adjacent to the second crimp roll pair member's side opposite the crimp roll pair member's side on which the first spacer plate pair is mounted.

12. The apparatus of claim 11 wherein the first shaft has a portion relatively larger in diameter forming a shoulder and wherein the first member of the second spacer plate pair is mounted on the first shaft abutting the shoulder.

13. The apparatus of claim 12 further comprising a means for rotatably aligning the second crimp roll pair including a plurality of axially aligned bores in the spacer plate pair members mounted on the second shaft, a plurality of axially aligned slots in the fourth crimp roll, a plurality of threaded screw receiving boreholes in the first side surface of said second crimp roll aligned with the bores in the spacer plate members and a plurality of screws positioned within the bores in the spacer plates in the slots of the crimp roll member said screws being tightened into the boreholes of said second crimp roll.

14. The apparatus of claim 8 additionally comprising:
a third pair of matching crimp rolls comprising a fifth crimp roll and a sixth crimp roll mounted vertically, one on each shaft;
a first means for laterally spacing the third crimp roll pair with respect to said first crimp roll pair;
a means for fixedly connecting the fifth crimp roll to the first shaft so that it is caused to rotate about the first axis as the shaft rotates; and
a means for operatively connecting the sixth crimp roll can be rotatably aligned with the third crimp roll.

15. The apparatus of claim 14 wherein the first means for laterally spacing the third crimp roll pair comprises a plurality of spacer plate pairs, wherein one member of the spacer plate pair is mounted on the first shaft and the second member is vertically above the first member on the shaft, wherein each member of the spacer plate pair is of equal thickness and wherein the spacer plate members are mounted on the shafts between the crimp rolls.

16. The apparatus of claim 15 wherein the space plate pair members mounted on the first shaft each have diameters sufficiently large so as to extend above the fluting of the crimp rolls mounted on the second shaft thereby forming a guide.

17. The apparatus of claim 10 having a third and a fourth pair of spacer plates wherein the third spacer plate pair is mounted on the shafts adjacently intermediate the first and third crimp roll pairs and wherein the fourth spacer plate pair is mounted on the shafts adjacent to the other end of the third crimp roll pair.

18. The apparatus of claim 17 further comprising a means for rotatably aligning the third crimp roll pair including a plurality of axially aligned bores in the third and fourth spacer plate pair members mounted on the second shaft, a plurality of axially aligned slots in the sixth crimp roll, a plurality of threaded screw receiving boreholes in the second side surface of the second crimp roll aligned with the bores in the upper spacer plate member and a plurality of screws positioned within the bores in the spacer plates and the slots of the crimp roll member said screws being tightened into the boreholes of said first crimp roll.

* * * * *